United States Patent [19]

Wolske

[11] Patent Number: 4,654,535

[45] Date of Patent: Mar. 31, 1987

[54] MENISCUS POSITION DETECTOR WITH DETECTOR AT THE FOCAL PLANE OF THE LENS FORMED BY TUBE AND LIQUID

[76] Inventor: James P. Wolske, 66 Hydro La., Chippewa Falls, Wis. 54729

[21] Appl. No.: 429,018

[22] Filed: Sep. 30, 1982

[51] Int. Cl.⁴ .............................................. G01H 15/06
[52] U.S. Cl. ...................................... 250/577; 73/293
[58] Field of Search ................ 73/293, 705, 747, 749; 250/231 P, 574, 577, 573; 356/128

[56] References Cited

U.S. PATENT DOCUMENTS

| | | | |
|---|---|---|---|
| 3,209,596 | 10/1965 | Kelly | 73/749 |
| 3,947,692 | 3/1976 | Payne | 73/293 |
| 4,084,426 | 4/1978 | Gates | 73/293 |
| 4,123,227 | 10/1978 | Heim et al. | 250/577 |
| 4,333,016 | 6/1982 | Bilstad et al. | 250/577 |

Primary Examiner—David C. Nelms
Assistant Examiner—J. Gatto
Attorney, Agent, or Firm—Andrus, Sceales, Starke & Sawall

[57] ABSTRACT

A non-invasive photoelectronic device which determines the location of a liquid column within a transparent tube. The device includes a source of visible light, transmitted as a substantially parallel light beam against a transparent lensing tube which may be a sightglass or a leg of a U-tube manometer located within the light beam. The liquid contained within the tube forms an identifiable liquid column which acts as a highly effective condensing lens to the transmitted light beams with a resultant focus close to the tube. A plurality of optoelectronic detectors are arranged in an array over the portion of the tube to be monitored. Each detector is a phototransistor which is responsive to the large change in light intensity caused by the lensing effect of the liquid-filled tube compared to the non-lensing action of the adjacent portion of the tube.

19 Claims, 11 Drawing Figures

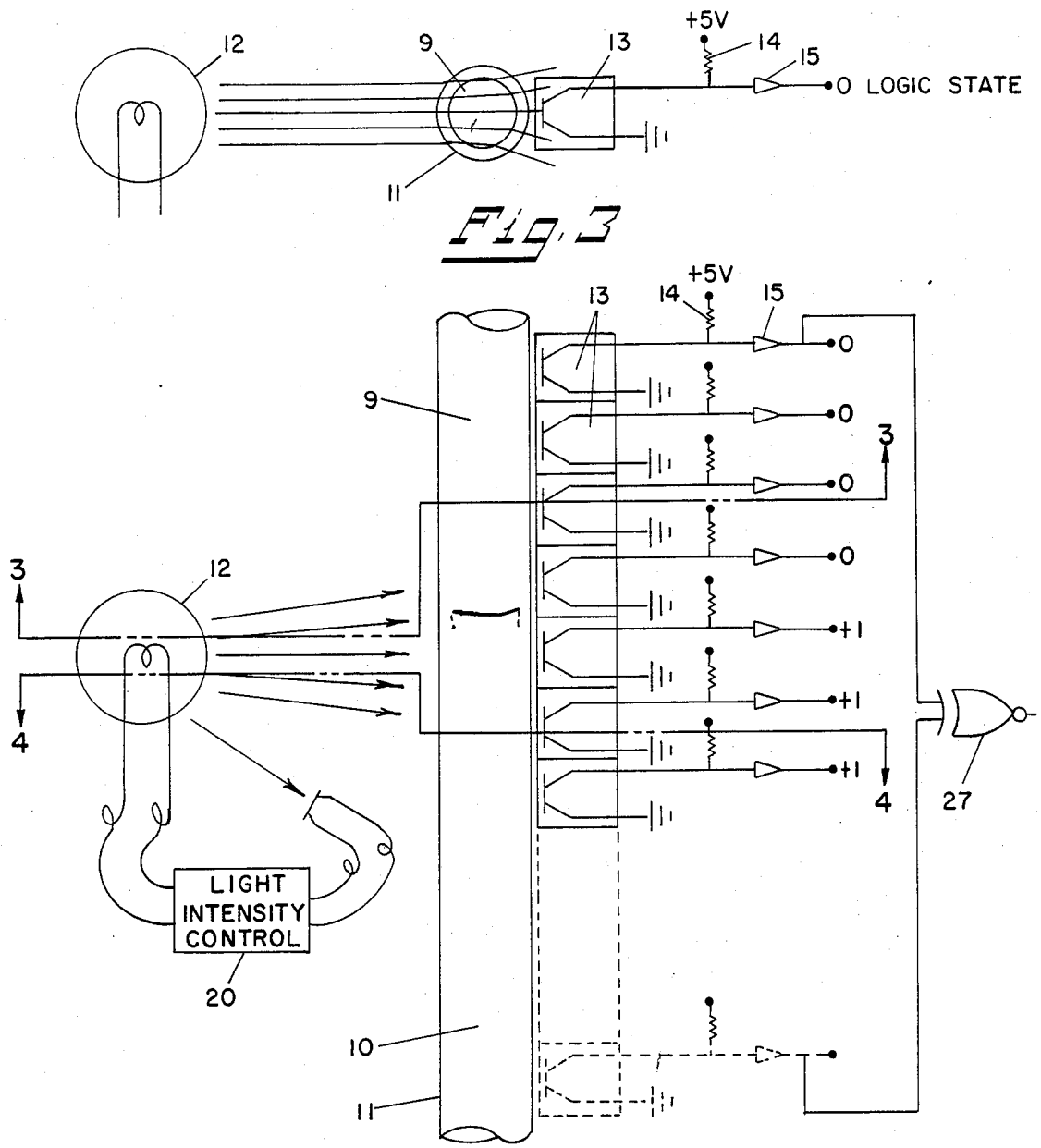
Fig. 3
Fig. 2
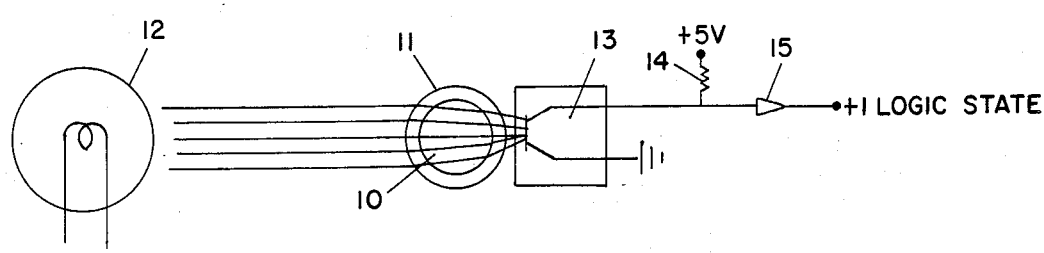
Fig. 4

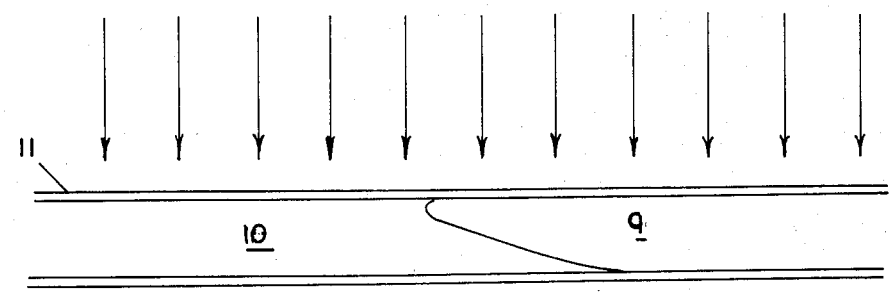
_Fig. 9_
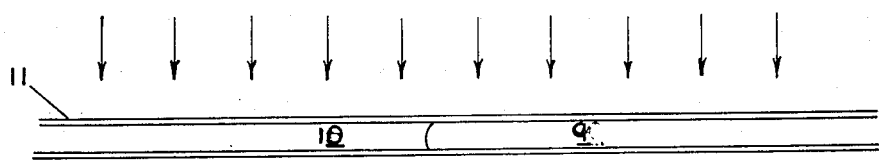
_Fig. 10_
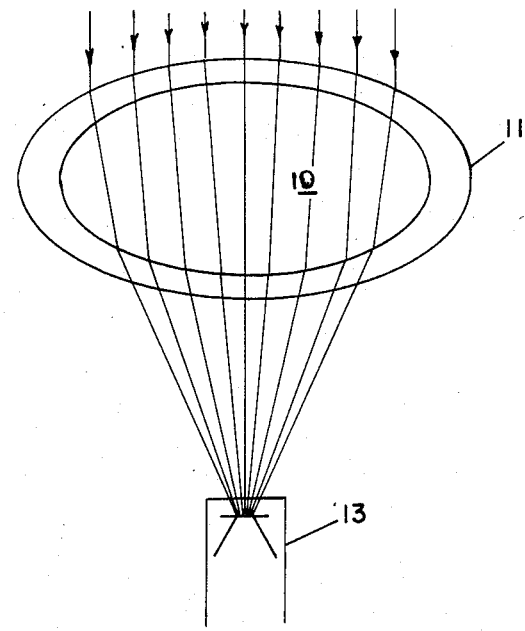
_Fig. 11_

MENISCUS POSITION DETECTOR WITH DETECTOR AT THE FOCAL PLANE OF THE LENS FORMED BY TUBE AND LIQUID

BACKGROUND OF THE INVENTION

This invention relates to a new apparatus and method of determining the location of the meniscus at the interface of two immiscible fluids and the determination of the relative lengths of the two fluids such as formed by either liquid-to-gas or liquid-to-liquid within the tube.

This invention has utility in conjunction with a sight tube and, particularly, a U-tube inclined manometer for electronically determining differential pressures and may detect differences as low as 0.001 inches water column imposed on the manometer. This invention also has utility for photoelectronic determination of the height of a liquid column within a sightglass as commonly found on boilers or liquid vessels.

DESCRIPTION OF PRIOR ART

Because a fluid is defined in the strictest scientific sense as either a liquid or a gas, the determination of the position of a meniscus also by definition determines the location of the interface of two liquids.

Therefore, the length or location of a column of a fluid is usually measured from an observable meniscus to an arbitrary datum. Historically, this measurement has been accomplished by visual observation of the meniscus within a tube and measured using a graticle or graduated scale.

U.S. Pat. No. 1,289,581 enhanced the visibility of the column of water by using a light source and a screen located with respect to the sight gauge tube which concentrates the light and locates the visual screen to disperse the light across the screen to produce a more readily readable light column. U.S. Pat. No. 2,252,727 discloses a level gauge tube with a light source illuminating a tube with a slit iris and a condensing lens to illuminate a photodetector. U.S. Pat. No. 2,362,872 also discloses a level gauge tube with a back strip, the magnification of which changes at the location of the "bubble". The Blackburn boiler water level gauge utilized the refractive properties of liquids and gases to visually enhance the separation of the light at the opposite sides of the liquid level or meniscus position in a prismatic tube, such as shown in U.S. Pat. No. 1,915,178. Remote telemetry of the Blackburn gauge commonly employs closed circuit television to monitor liquid levels. The Blackburn gauge, even with its remote telemetry, requires the use of special alignment features and light prisms to utilize the refractive index differences of liquids and gases.

U.S. Pat. No. 2,070,617 and 4,110,609 also utilize a masking effect or opaque liquid to reduce the total light transmission through the sightglass onto the optoelectronic receptors and, therefore, distinguish between liquid and gas within the tube.

Off-axis alignment of the photoreceptors and the light source with alignment on the edge of the sight tube such as shown in U.S. Pat. No. 4,154,000 is similar to the Blackburn principle of U.S. Pat. No. 1,915,178, in that the arc segments of U.S. Pat. No. 4,154,000 act as the non-parallel sidewalls of the Blackburn-type prism which, in effect, generates a triangular prism when full of liquid and generates a void between two transmissive surfaces when void of liquid with resultant two different refracted light paths.

Other prior art relating to photoelectric detectors are shown in U.S. Pat. Nos. 2,817,237; 2,980,802; 3,794,428; and 3,549,893. U.S. Pat. No. 2,817,237 addressed the state of the art of optoelectronics.

U.S. Pat. No. 4,333,016 which issued on June 1, 1982, utilizes a typical commercially available emitter and a phototransistor detector to detect a liquid presence. The phototransistor includes a convex lens on the active surface of the phototransistor which receives the parallel incoming light from a sight tube chamber and focuses it onto the transistor active surface area to produce a detectable change as the meniscus passes the detector. The circular area of the lens acts as an upper limit on the light-gathering power of the system.

In U.S. Pat. No. 4,333,016, a light emitting diode source is located spaced from the chamber to locate the source at the focal point of a lens that is created by the chamber and the liquid when the liquid is present. The light from the tube is collected by the receptor lens and applied to the sensitive area.

Experience and observation has shown that manufacturing quality control variations cause undesirable, but unavoidable, property variations within the lensed phototransistors themselves and, therefore, the output characteristics of any one array may be intolerably different from that of another array.

These deviations in operating characteristics are the result of semiconductor doping, semiconductor chip size, and others. Litronix offers their individual phototransistors pre-segregated according to various photocurrents at a given test bias voltage and irradiance; BPX81-1 at 0.5 to 0.10 milliamperes; BPX81-2 at 0.8 to 1.6 milliamperes; BPX81-3 at 1.28 to 2.56 milliamperes; and BPX81-4 at 2.0 to 4.0 milliamperes. However, their multi-element arrays of these phototransistors are not segregated according to performance and, therefore, have a wide tolerance of specified output current ranging from 0.32 to 5.0 milliamperes under similar calibration standards. Such wide product variations may be easily compensated for on a singular phototransistor application basis such as in certain prior art, but is quite difficult if an array of sensors are used to closely monitor the position of the column.

Although prior art does place the receiver's active element at a point of focus of the emergent beams, that point of focus is brought about by the condensing of parallel light exiting the liquid-filled tube by passing it through an extra convex focusing lens molded onto the face of prior art's phototransistor. As a result, the effective aperture size for light-gathering ability in prior art is approximated by that diameter of the receiving phototransistor lens where all rays are parallel and, as such, has an inherent optical inefficiency in its design.

SUMMARY OF THE INVENTION

Present invention takes the converse approach and places the receiver essentially directly at the focal plane of the liquid-filled tube to directly receive the light in the path as created by the liquid-filled tube which in combination with a substantially parallel input beam source light results in a substantial change in output when the liquid is not present. The aperture of present invention is, therefore, that full width diameter of the transparent tube which is substantially greater and, therefore, yields a proportionately stronger signal. The present invention produces a substantially greater difference in signal strength. Thus, the present invention can readily produce a signal strength ratio of 10:1 in contrast to the prior art changes of about 3.5:1. The difference in result arises because of the manyfold increase in the effective aperture size of light-collecting ability of the present invention.

Thus, the present invention is comprised of a light source of substantially parallel rays striking the side of the liquid-filled tube and the light rays are focused, unaltered by other lenses, slits, or masks, or other means, onto the active area of a photoreceiver which possesses a wide acceptance angle; i.e. accepting both parallel and converging light. This very wide acceptance angle is inherent only with flat or concave face photoreceivers, and the photoreceiving means of this invention uses only such a receiving surface or one essentially and effectively of that shape.

The strong signal ratio and tolerance in alignment particularly adapts this invention to a multi-element array configuration, such as required in one of the most significant embodiments of present invention.

Inherent batch lot differences in prior art's phototransistors could make the behavior of such a conjectured array unpredictable which would require more complicated compensation techniques. Prior art acts only as a single point detector and does not address the problems or solutions as encountered in multi-element detector arrays.

OBJECTS AND ADVANTAGES OF THE INVENTION

An objective of this invention is to provide an innovative optoelectronic device for determining the location of a liquid column within a tube, and if desired, the relative length of the liquid column. This invention is particularly useful for monitoring a liquid-filled U-tube manometer with an electronic output which may be transmitted to a remote station.

This invention may also provide an innovative optoelectronic device for determining the position of, or length of, an air bubble within a tube, such as the fluid vial of a spirit level such as used for detecting angle of inclination from the horizontal plane. The light would be transmitted vertically through the unit.

Some obvious advantages of this invention include, but are not limited to, the following:

1. The containment tube may be cylindrical in shape (circular in cross-section) usually of glass or clear plastic tubing of any kind and a wide variety of sizes. This tubing is very inexpensive, requires no special grinding of surfaces, nor does it require specialized or difficult to manufacture extruded shapes, is very strong in high pressure or high vacuum environments, and is a monolithic structure with no leak-prone mating surfaces to seal. This tubing is preferred to be colorless and transparent, but may be lightly-colored or even slightly translucent insofar as a sufficient light signal reaches the photoreceptors.

2. A single light source is usable without any specialized columnating lenses, aperature slits, or masking techniques. Alignment of the light source is simple and consists of merely exposing the entire side area of the tube to the light source which is placed at a distance from the tube to allow substantially parallel rays of light with high photon flux to strike the entire tube sidewall reasonably perpendicular to the axis of the tube at the zone of interest. A single light source placed at the required standoff distance has the distinct advantage in that it floods the detector with a very uniform illumination, a uniformity generally not possible in prior art. Multiple light sources may be used if the same objectives are met.

3. A simple array of discrete light detectors including phototransistors or other photodetectors having an essentially unobstructed or non-lensed active area to produce a wide angle of acceptance is used. These readily available arrays possess a compact center-to-center spacing between active surfaces which allow excellent position resolution of the meniscus to 0.10 inches with a Texas Instrument TIL 621 series and to 0.001 inches with Reticon "S" series, solid state, self-scanning, linear photodiode arrays. The phototransistors can be used in a photoresistive mode or photoconductive mode. Further, other devices such as photodiodes or solar cells, for example International Rectifier SAR-10-08-BPL, in a self-generative mode as a light dependent current source can be used. Phototransistors have a high output response or signal strength per unit light flux and in this invention, when correctly biased, will change electrical state by a factor of 10 of more. This large change in electronic state lends itself to binary logic with its inherent precision, repeatability, non-ambiguity, and non-drifting output. This binary electronic output readily lends itself to further electronic processing into a more useable form.

4. Any of a wide selection of working fluids is useable, including transparent, slightly translucent, and colored liquids; provided that the index of refraction of the fluid within the tube causes a sufficiently strong signal change on the phototransistor surface. The present invention will work well with most fluids, including, but not limited to, acids, bases, brine, water, oil, or syrup. Present invention will also work with some liquid-over-liquid systems, such as water-over-mercury or foam-over-water, where the index of refraction of the water causes the lensing of the light onto the phototransistor active surface.

5. Simple alignment procedures permit receptors location at the tube's focal point and only requires positioning the phototransistor array against, or nearly in contact with, the surface of the cylindrical tube at a position diametrically opposite the light source and at a place reasonably perpendicular to that diameter line. Because no lenses, aperature slits, masks or shades, columnating devices, light guides, or substantial alterations to the emergent focusing light are used, alignment consists of determining the proper standoff distance from the tube to the phototransistor such that the phototransistor active surface is at the point of greatest light intensity or focal point of the beam traversing the liquid within the tube. A slight adjustment at the standoff distance is encountered in practice because the active element is preferably encased in thin, clear plastic and not held in free air. This invention is, thus, particularly suitable for large arrays wherein the enhanced optical signal strength arising from the large effective aperature of the complete tube diameter compensates for the normal manufacturing tolerances encountered in commercial phototransistors and the like. Signal strength ratios are sensitive also to the more stringent alignment requirements of prior art with its receiver's narrow acceptance angle than with present invention's very wide acceptance angle. Present invention's strong parallel ray light source impinging full diameter on the tube maximizes the system's light-gathering power while its' modified wide acceptance angle phototransistor maximizes the photon capture rate and simultaneously minimizes transistor leakage current when liquid lensing is not present.

The invention discovered by the inventor is based upon the realization that the strong condensing or converging lens effect of the light-transmissive liquid disposed within the tube will cause an incident beam of parallel light to focus onto a planar optoelectronic surface with manyfold increase in the light intensity at the focal point which produces a substantial, quasibinary change of electronic state of the optoelectronic sensor array placed at the focal point. This binary data signal may be electronically processed to yield a signal representative of the position of the meniscus.

DESCRIPTION OF THE DRAWING FIGURES

The drawings furnished herewith generally illustrate the best mode presently contemplated for the invention and are described hereinafter.

In the drawings:

FIG. 2 is a fragmentary view of a portion of the manometer tube shown in FIG. 1.

FIG. 3 is a cross-section taken generally on line 3—3 of FIG. 2.

FIG. 4 is a cross-section taken generally on line 4—4 of FIG. 2.

FIG. 9 illustrates one probable interface in an inclined manometer with a signal distribution.

FIG. 10 is a view similar to FIG. 9 illustrating another interface and related signal trace.

FIG. 11 is a modified cylindrical tube creating an inherent lensing.

DESCRIPTION OF THE ILLUSTRATED EMBODIMENT

Figure 1:
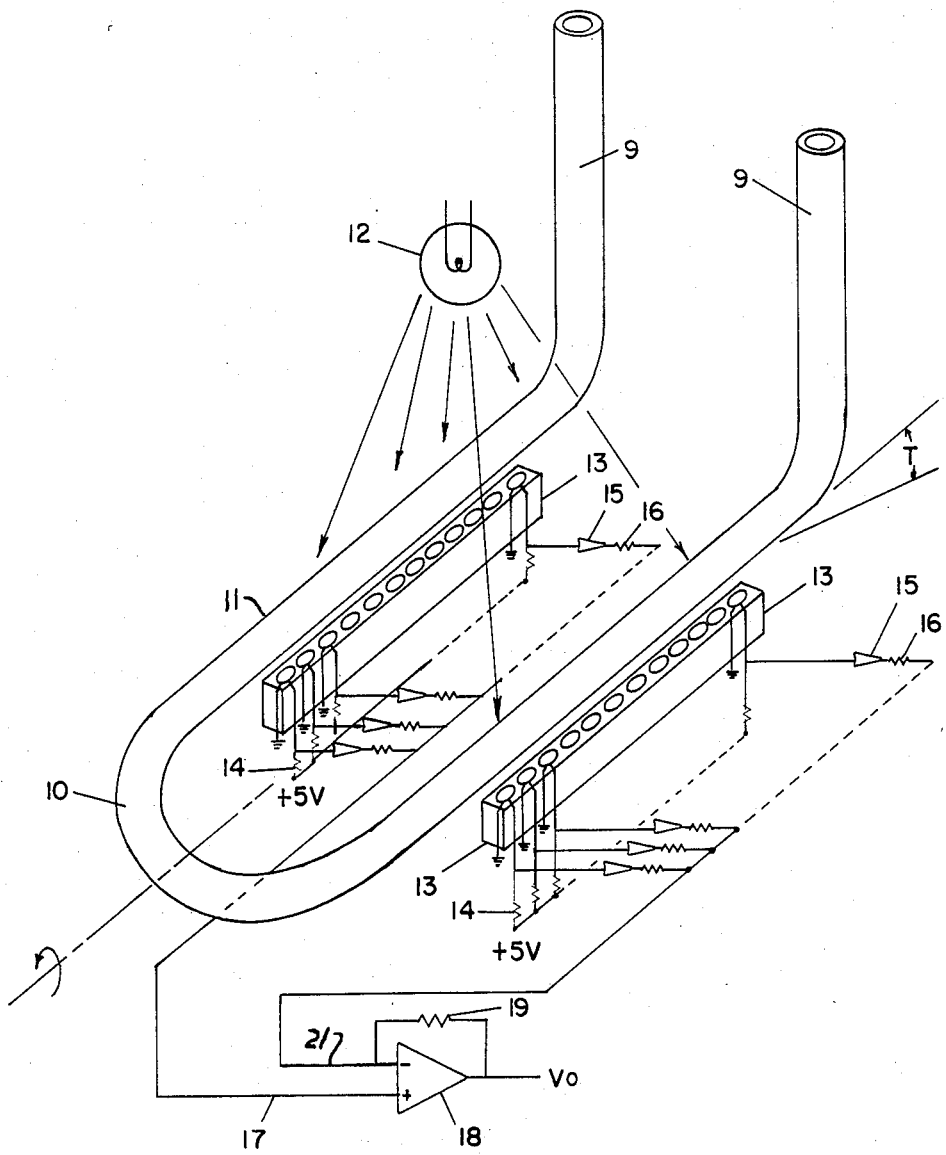
FIG. 1 is a pictorial view of a manometer illustrating one embodiment of this invention.

FIGS. 1 to 4 illustrate the apparatus arrangement comprising a standard incandescent lightbulb disposed approximately 20 to 50 diameters from the legs of a manometer tube 9. The lightbulb 12 is placed orthogonal to and equidistant from the respective legs of the manometer and located such that the bulb is generally vertically above the manometer legs.

The manometer 9 is constructed of cylindrical glass tubing typically ¼ inch outside diameter, is heated and bent to a U-shape configuration six inches long with vertical legs, three inches high, to prevent loss of fluid 10 disposed within tube 9 during over-pressurization. Fluid 10 partially covers each array of phototransistors 13. The vertical legs are connected with tubing to the pressure sources that are to be measured. The entire U-tube manometer is inclined with respect to the horizon and is preferably rotatable about the axis of the manometer legs.

Beneath the respective manometer legs are two linear arrays of very wide acceptance angle, flat-faced and polished phototransistors 13 secured in linear array sockets such that the arrays are on a straight line projection from the light source 12 and the axis of the respective manometer leg 9. Each phototransistor array 13 is placed at the focal point of the corresponding liquid-filled tube 9 and, thus, in close proximity to the manometer tubes 9 such that the light passing though the liquid-filled tube will concentrate on the small photosensitive chip in the phototransistor 13. Each entire array is axially adjustable along the length of the glass tube.

Phototransistor arrays are readily available with center-to-center spacing of active areas of 0.10 inch and active receptor areas of 1 mm$^2$ and smaller. (Texas Instrument TIL 620 series) A high gain or sensitivity combined with the compact spacing of the phototransistor permits the use of the phototransistor array to give a high resolution binary logic output as a function of the meniscus position.

Each individual phototransistor 13 is connected in series to a resistor 14, the resultant multiple series circuits are connected as a multi-element voltage divider array of matched components. The phototransistor 13 emitters are common-grounded and the other end of resistors 14 are connected to a common plus five volt bus, as shown.

The collector terminals are individually connected to respective inputs of Schmitt triggers 15, whose output terminals are connected to individual matching summing resistors 16. The outputs of all summing resistors 16 of each leg are connected common as a summing junction feeding respectively the inverting and non-inverting inputs of operational amplifier 18. Suitable amplifier gain is determined by adjusting impedance 19, resulting in an output voltage $V_o$ proportional to the differential pressure imposed on the respective legs of the manometer. At very slight angles of inclination, this system will detect differential pressures of 0.001 inches water column.

Figure 5:
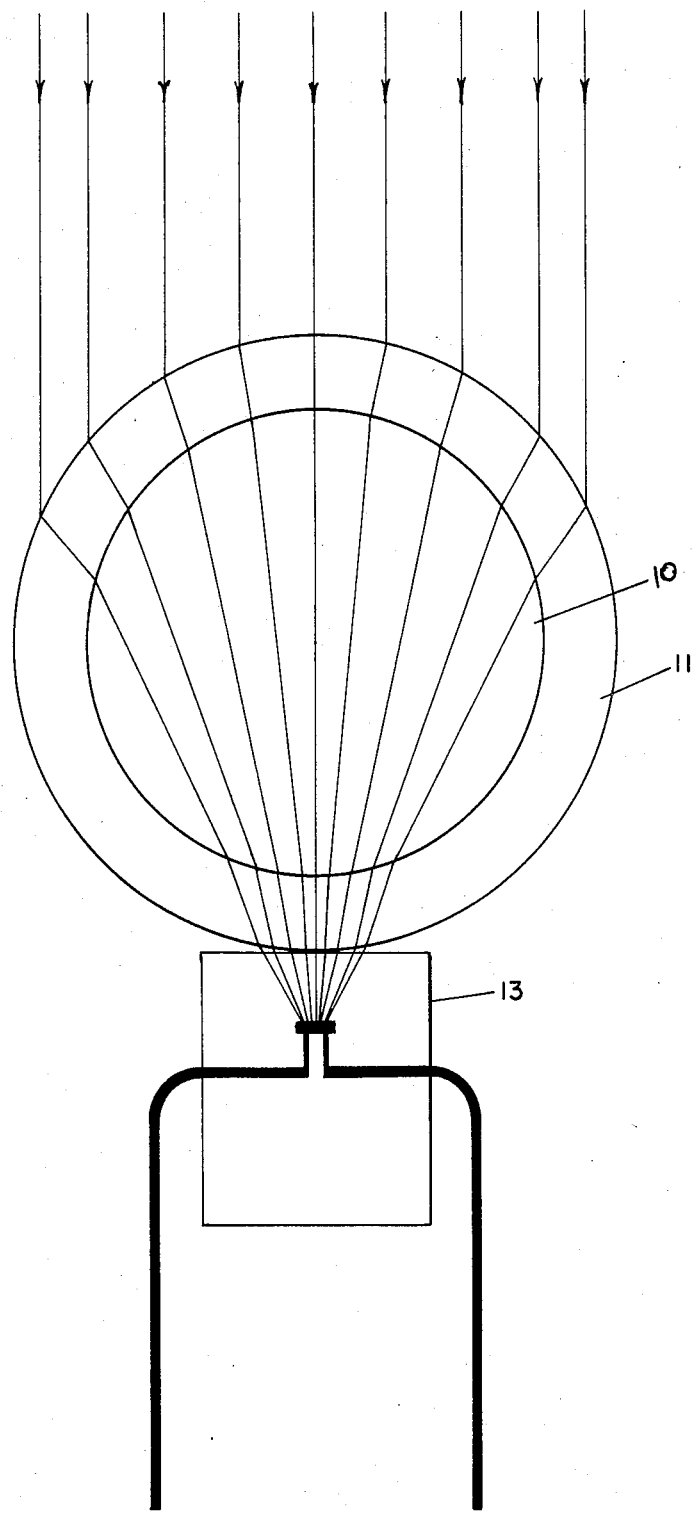
FIG. 5 is an enlarged sectional view of the liquid-filled tube illustrating a converging lens action.

The light path for a liquid-filled column is generally shown in FIG. 5. The illustration is an idealized approximation of the beam path and is given for clear description of the lensing effect of the liquid 10 within the tube 9. Likewise, FIG. 6 with gas 9 in the same tube 9 generally illustrates the locus of a beam path. This clearly shows the net result which is that FIG. 5 causes a manyfold and useful intensification of light at the small area of focal point; whereas FIG. 6 causes a minor, but noticeable decrease in exiting light intensity relative to ambient levels at that same plane of interest. The cylindrical tube shape of FIGS. 5 and 6 can within this invention be somewhat flattened but convex-sided tube member and will produce a significant converging lens as shown in FIG. 11. FIG. 11 could result from using a pliable, plastic tube in lieu of a round glass tube. Because infrared radiation is attenuated severely by some plastics, glass, and liquids, visible light is the preferred spectrum.

Figure 6:
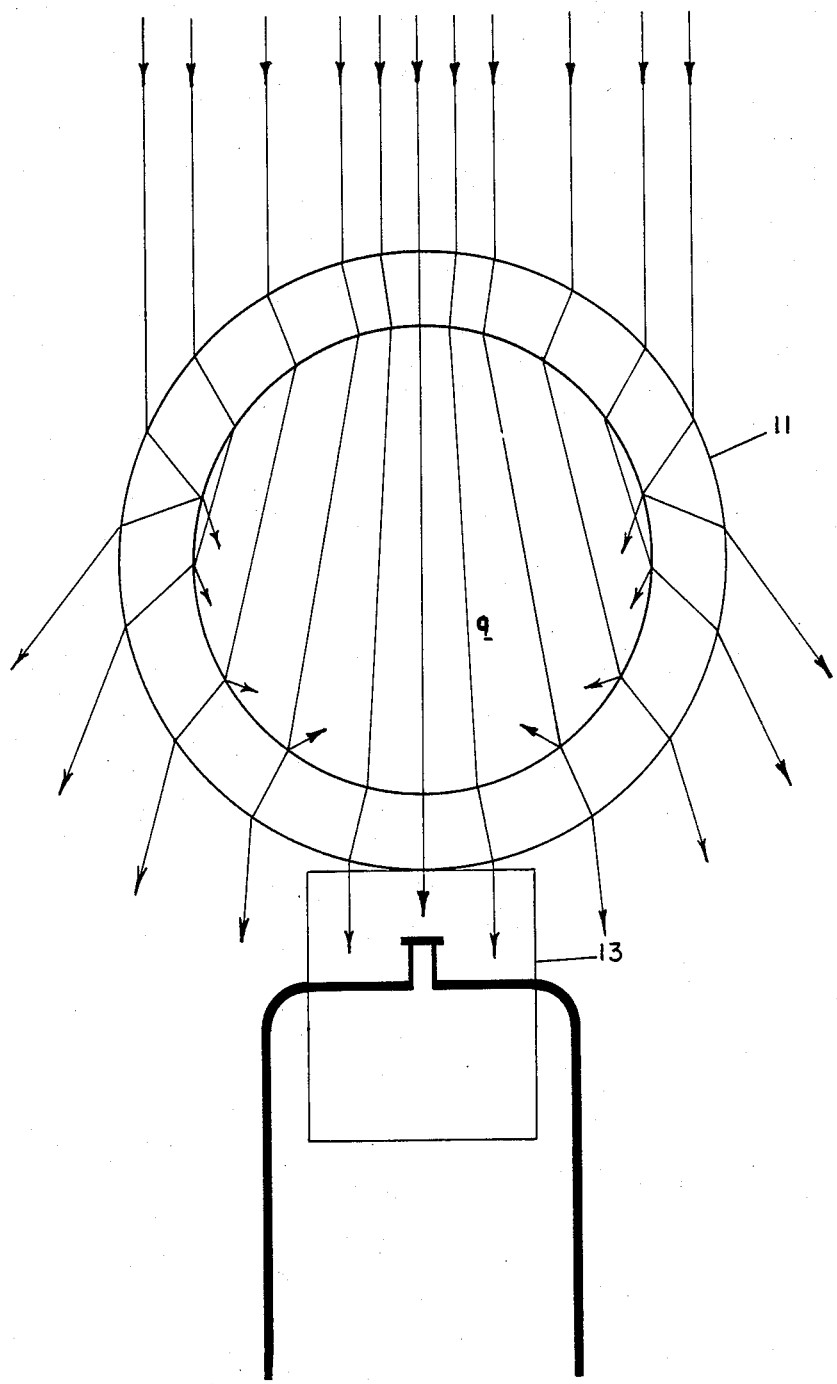
FIG. 6 is a view similar to FIG. 5 and illustrating the light dispersion.
Figure 7:
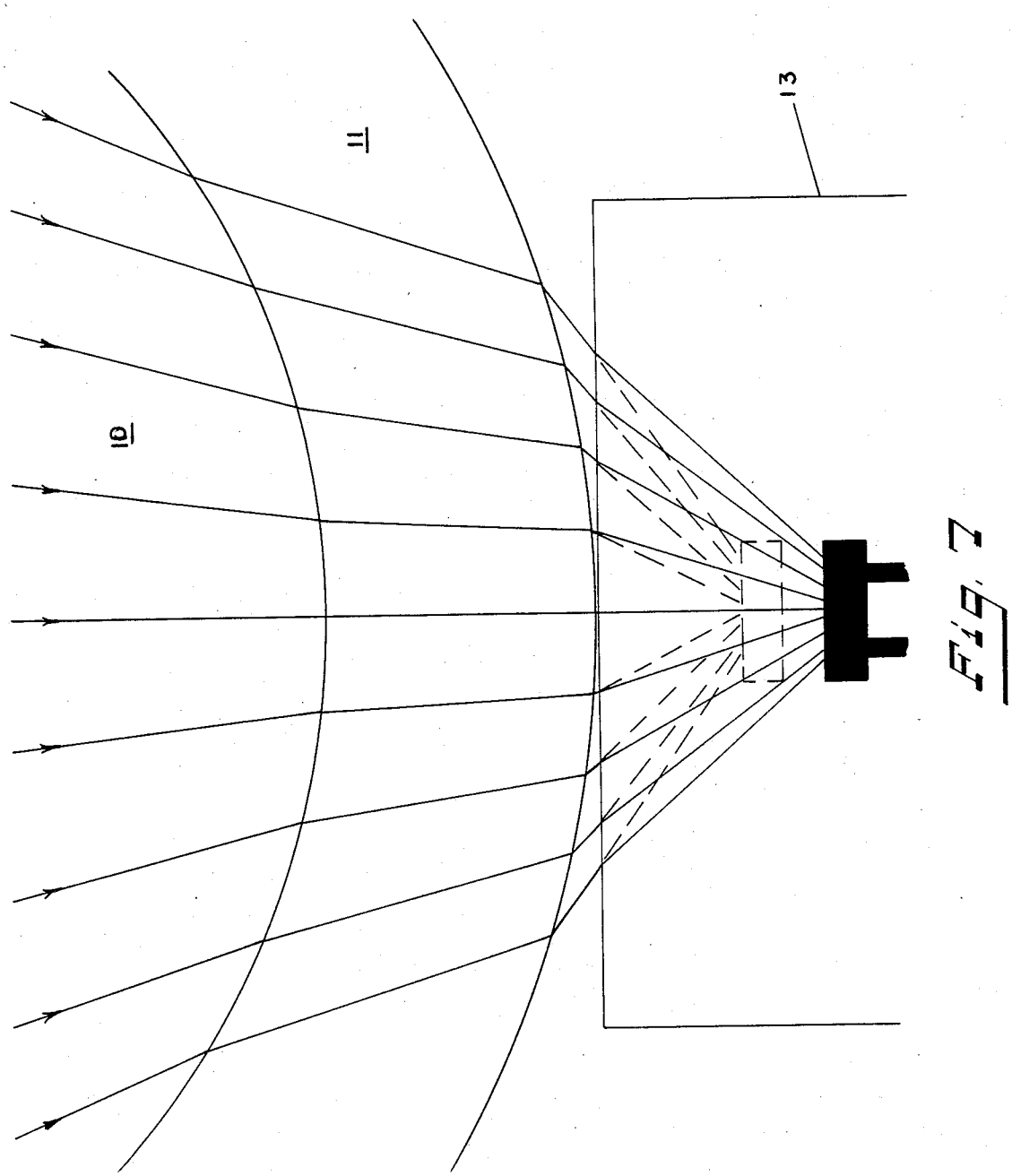
FIG. 7 is an enlarged fragmentary view illustrating the projected focal point created by the protective layer on the photosensitive device.

In carrying out this invention, off-the-shelf commercially available phototransistors were used after removing the front lens cap from the arrays to produce a structure such as shown in FIGS. 5 and 6. Thus, the structure was a non-lensed, flat-faced, and polished receiver. This produced an appropriate receiver having the desired wide angle of acceptance with no secondary lensing. Therefore, in this invention, all condensing or focusing functions are done solely by the liquid-filled tube 9. The thin, protective face, which will generally be only about 0.030 inches thick, may require a slight, but inconsequential, change in the receiver standoff position to compensate for the projected convergence point resulting from the "equivalent air slab thickness" of the encapsulation material. This standoff position adjustment is, thus, determined by the equivalent air slab thickness and is a function of the index of refraction of the encapsulation material, but is typically two-thirds that of air. That is to say, the active element appears one-third closer than if it was in the air. FIG. 7 depicts how the true focus point is affected by the "equivalent air slab thickness". Some liquids, for example kerosene, have an index of refraction different from that of, for example, water; therefore, slight position adjustment of the receiver array may be desirable to accommodate this different focal point. The voltage divider output ratio of FIG. 1 is typically 10:1 with the preferred flat lens, wide acceptance angle arrays.

During tests of present invention unmodified phototransistor arrays were used, but it was observed that the behavior characteristics of neighboring array groups, and even adjacent phototransistors integral within the same molded array, had considerable and unacceptable output deviations when subjected to reasonably identical test conditions. Yet, the same comparison using modified or flat-faced phototransistor arrays, FIGS. 5 and 6, showed a high 10:1 voltage ratio that was reasonably constant from element to element within a single integral molded array group and similarly constant from one array to the next.

The use of a clear, colorless, transparent liquid, for example kerosene or water, within a glass tube produced the desired light contrast at the focal point of the liquid-filled tube. Therefore, this invention uses a liquid-filled tube acting as a condensing or converging lens for full sidewidth parallel ray illumination without any intermediate convex lens or other modifying elements which might create undesirable secondary refocusing.

The result of this invention is an apparatus useable as an optoelectronic sensor with quasi-binary electronic output to be used with and without implied limitation, for example on manometers, sightglasses, and spirit levels.

This invention can also use standard non-lensing detectors, such as Reticon "S" series linear photodiode arrays or Litronix BPX92, BPX93 photodiodes, or Litronix BPY11P-4, 5, 6, silicon photovoltaic cells which are placed at the primary focal plane of a liquid-filled tube insofar as the active area is covered by the wedge of focused light and dark currents do not generate noise which lowers the signal to noise strength ratio.

Present invention, by virtue of its substantially larger effective aperture, can obtain a much larger light signal and does not rely on any precise alignment requirements.

It is also within the scope of this invention to utilize a second array on each tube displaced one-half pitch and with its own light source to increase resolution of the meniscus position from, for example, 0.10 inches to 0.05 inches.

Various configurations for tube size, illumination direction, and relative standoff distance of the phototransistors from the center line, or axis of the tube, were tried.

A light source found to be simple and functional consists of an incandescent bulb 12 placed many diameters from the tube to assure that substantially parallel light beams will impinge on the tube sidewalls at an angle essentially perpendicular to the tube axis at the region of interest of the tube.

The wetting properties of the fluid, the angle of tube tilt, and the tube inside diameter are important factors in the shape of the meniscus as shown in FIGS. 9 and 10. In FIG. 9 a ¼ inch inside diameter tube is illustrated partially filled with water and, having a meniscus typical of a tube tilted at an angle of 15° from the horizontal. The meniscus in FIG. 9 has a longer relative profile than does the meniscus of FIG. 10, which represents water disposed within a 5/32 inch inside diameter tube also inclined at 15° from the horizontal. Of course, the shape of the meniscus in almost any size tube, large or small, is of a suitably short profile if the tube is inclined perpendicularly to the horizontal plane. Therefore, the change in light intensity at the focal point will possess the desired abrupt transition from high to low brightness as the light passes either through the liquid or through the gas respectively.

Because the meniscus is spread out in FIG. 9, the position of the meniscus is actually a zone of finite length; and a shorter, but finite, length in example using a different arrangement or smaller tube, such as in FIG. 10. For the sake of uniformity in the context of this invention, the position of the meniscus is to be interpreted as a relative position only. This relative position then can be identified as a point anywhere along the liquid-to-gas interface surface, a point at which, for example, the transmitted light focuses and intensifies to a certain arbitrary value. With the understanding that the position of the meniscus becomes dependent upon an arbitrary definition, it becomes superfluous and pointless to argue about whether present invention truly determines the position of the meniscus or some other arbitrary point relative to the meniscus. Also, because the optoelectronic detector array has a finite distance between receptors and the arrays' discrete elements are intended to operate in a quasi-binary fashion, it is obvious that the position of the meniscus, as interpreted by present invention, is an approximation of what someone else may claim to be the true position of the meniscus and within the scope of this invention, such arguments become pointless.

Because the profile of the meniscus stays relatively constant as the meniscus traverses the tube length, and because the bubble within a spirit level type application is symmetric about a centerplane, any arbitrary offsets in the true position of the meniscus, compared to present invention's optoelectronic position indication, will mutually nullify. This offset nullification lends itself to manometers and this inherent symmetry nullification lends itself to spirit level applications.

Present invention, when applied to liquid manometers, is responsive to the illumination contrasts when the phototransistor array is positioned at a distance from 1 to 3 tube radii from the tube centerline. The strongest focus occurs at approximately 1.1 radii from the centerline.

Experimentation has revealed that manufacturing differences cause variations of phototransistors such that it is desirable that they be coupled to some form of output signal conditioning device such as 74LS14 Schmitt triggers, as shown at 15 in FIG. 1, or other binary device, for example switching transistors or comparators. Schmitt triggers have the advantage of a built-in hysteresis loop to remove output ambiguity or vascillation.

Correct levels of illumination can be accomplished by moving the light source farther from, or closer to, the glass tube or by shading the light source, or by a simple electrical dimmer circuit, for example a rheostat or solid state, self-adjusting light dimmer such as shown at 20.

This invention also contemplates a voltage divider array of correctly biased phototransistors located along each respective manometer leg with each discrete phototransistor connected in electrical series to corresponding single resistors of suitable resistance such that when a direct current voltage is impressed on any of the resistor/phototransistor pairs, a voltage divider circuit is established. The output of this array of voltage dividers will then be responsive, element by element, to the presence or absence of the fluid at that particular element location. It is obvious that the phototransistors and voltage divider resistors could be interposed, or that the Schmitt triggers could be of the non-inverting configuration without exceeding the scope of this invention.

This typical variation of output of the voltage divider arrays usually requires signal conditioning by Schmitt triggers, comparators, or other signal conditioning to remove signal ambiguity, vascillation, drift or noise, and to positively establish a useable binary logic output from each phototransistor/resistor voltage divider pair.

The hysteresis loop output generated by the Schmitt triggers yields a unique, nonvascillating output of either plus 4.0 volts hi logic state or approximately 0.1 volts lo logic state depending upon whether the signal output voltage is below or above the approach Schmitt trigger voltage.

This invention also contemplates a means by which the individual output of each Schmitt trigger 15 feeds a single summing resistor 16 and whereby each Schmitt trigger and summing resistor combination on a common leg of the manometer is connected to an electrically common input point 21 referred to as a summing junction to the operational amplifier 18. Each summing junction electrically represents the level of the liquid column within its respective manometer leg, FIG. 1. The subtraction of the electrical signals of the respective summing junctions 17 and 21, one from the other, will yield the electrical equivalent of the imposed differential pressure as measured by the inclined U-tube manometer. This electrical subtraction process is easily accomplished by the use of an integrated circuit operational amplifier, for example, a type 741.

This amplifier will respond as a linear differential amplifier 18 to the input signal difference and by the use of a feedback network 19 will yield a useable output signal with suitable gain and time constant. At the user's discretion, this output signal can be conditioned or modified by time integration or totalized, square-rooted, multiplied, or converted to another signal form, e.g. pneumatic, mechanical or others, which most suits the physical parameters being measured or controlled in the instant application. These signal modifications, or conversions, are by no means limiting or all inclusive, but are cited merely as examples in which differential pressure is used as primary data for measuring flow velocities, flow totals, liquid depths, or other physical quantities, and for the control of these variables.

Figure 8:
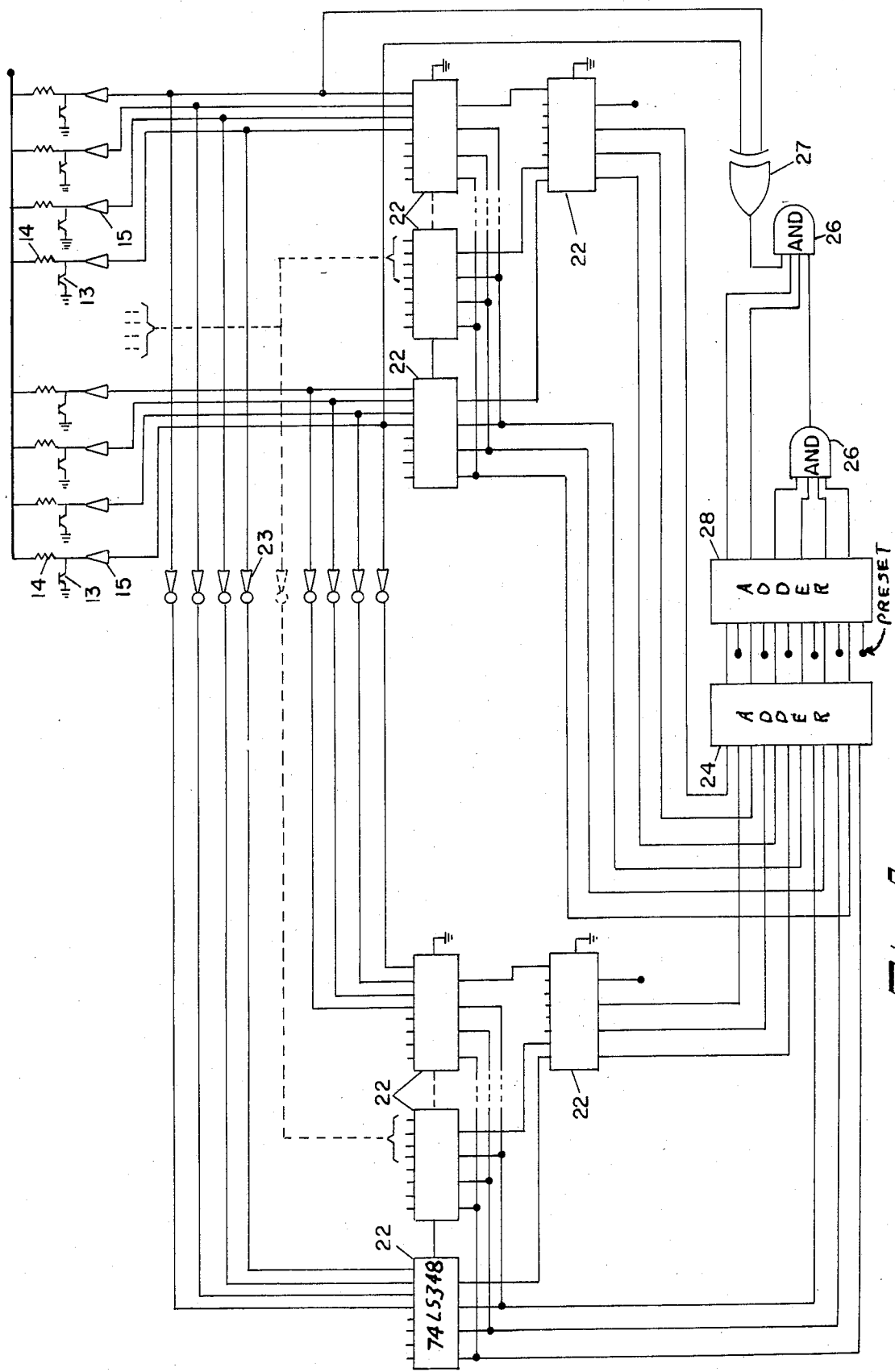
FIG. 8 is a schematic of a signal processing circuit for the manometer unit of FIG. 1.

This invention also contemplates a second and different electronic circuitry using a digital electronic device called a priority encoder, instead of the summing resistors and summing junction. The original inclined U-tube manometer with its light source and with its phototransistor/resistor voltage divider arrays and respective Schmitt trigger array is retained, but the summing resistors and the operational amplifier are replaced by a priority encoder 22, as shown in FIG. 8. This priority encoder(s) has the same number of signal inputs as there are phototransistors in the array. The resultant output of the priority encoder is a binary-coded digit (BCD) which represents the location within the array of the first logic transition of the respective arrayed photosensors. As with the first preferred embodiment, this embodiment also has identical sensor circuitry on each leg of the manometer, but with this embodiment the outputs of the respective priority encoders, FIG. 8, are readily subtracted using binary arithmetic electronic techniques well-known to the art to yield a single binary output which is representative of the differential pressure imposed on the manometer. It is within the scope of this patent to delete the use of Schmitt triggers or other signal conditioners when the input signal strength to, and sensitivity of, the priority encoder permits such deletion.

FIG. 8 contemplates two over-range detector systems 27 to alarm if ever the meniscus exceeds the end limits of the array. EXCLUSIVE-OR gates 27 feed AND gate 26 which will fail to the hi logic state upon over-range conditions.

FIG. 8 shows the electronic apparatus comprising a binary digitizing system for use with the same manometer 9, light source 12, resistors 14, phototransistor 13, and Schmitt triggers 15 as illustrated in FIGS. 1 to 4. The outputs from the sequential Schmitt triggers 15 directly connect to an equal array of inverters 23. The outputs of inverters 23 direct feed to the sequenced inputs of another set of priority encoders 22. This entire circuit exists for each leg of the manometer and its respective phototransistor array 13.

The output of one group of priority encoders 22 yields a binary coded digit equivalent to the position of the meniscus in that leg and the other priority encoder group 22 yields a second binary coded digit which is, under normal operation, the complement number to the first number.

FIG. 8 shows the circuit arrangement which tests for parity of the two complement binary numbers by use of ADDER 24, whose output is added with presetable input ADDER 28. Output of ADDER 28 is tested by AND gates 26 such that all output lines are in the hi logic state and tested with over-range logic test 27. A lo logic state from the output of either AND gate 26 will generate an alarm condition.

The binary coded digit equivalent to the differential pressure across the manometer is generated by the binary subtraction of the output of one array from the binary output of the other's array by use of binary arithmetic means known to the art.

The parity check 24, 28, and 26, is shown added to each of the manometer's optoelectronic read-out circuits to test against failed components or inclusions or dirt within the liquid-filled manometer. This contemplated parity check usually requires the signal inverters 23 at the outputs of the Schmitt array, whereby these inverter outputs feed another priority encoder which then yields the complement binary number for that leg's array as shown. The function of this parity check is to provide a means to count up from one end along a given array from the liquid-filled end, and to simultaneously count down from the top along the same array from the other end of the same array. Logically, if there are; for example, 18 elements in a single array and the first priority encoder counts up from the bottom to 5, the first 5 phototransistors are triggered by the lensing of liquid within the manometer tube. Then the complement priority encoder will presumably count down to 13 (18−5=13) from the top, or from the other end of the manometer. A simple, presetable, binary adder 28 and logical AND test 26 will alarm if the respective priority encoders do not complement (add up to 18 per the example). The obvious advantage of this parity check is to positively identify and alarm to either failed components or to inclusions within the manometer fluid, and in fact may be deemed a necessity in operations requiring fail-safe controls.

The alarm system 27 monitors the logical levels of the two opposite end elements within an array and will alarm if both end elements ever are at the same logic level. Thus, this contemplated logic test will alarm if ever either the fluid level exceeds the scan limits of the phototransistor arrays, or if the source of light either fails or become too bright or too dim.

It is within the scope of this invention that this digitally coded output be processed for data transmission, digital square root extraction, digital multiplication, and for direct interface with other monitor and control systems.

By using the unmodified TIL 621 phototransistor array with cap lens, an output may also be measured across the collector/emitter terminals. The illustrated 74LS348 priority encoder system may be used to trap this transition point as useable electronic data as representative of the meniscus position. Either the modified or unmodified phototransistor array as used with priority encoders will function, for example, as a spirit level electronic readout device.

While the above preferred embodiments are rather specific, it is not the inventor's intention to limit variations from these embodiments. In fact, two of many such variations are explicitly depicted yielding both an analog and digital output from the invention. Various modifications, substitutions, and applications, such as single leg applications and others, are anticipated as part of this patent, and, therefore, may be made without departing from the scope of this present invention.

Various modes of carrying out the invention are contemplated as being within the scope of the following claims particularly pointing out and distinctly claiming the subject matter which is regarded as the invention.

I claim:

1. A photoelectronic device for determining a meniscus at the fluid juncture of two immiscible fluids within a tubular member, whereby said system is comprised of a tube having a substantially cylindrical cross-section of a light transmissive material, said fluids and fluid juncture movable through said tube and having distinctly differing refractive properties, at least first of said fluids being a liquid having refractive properties which within said tube acting conjointly with said tube to define a converging lens, a light source disposed on one side of said tube for creating substantially parallel beams of light impinging on the aligned substantially entire exposed side of said tube and transmitted by said aligned tube and said fluids, a photosensitive means having an exposed active area, said photosensitive means being located to the opposite side of said tube and spaced from the tube, said space between said active area and said tube being essentially formed of a constant uniform medium to transmit directly all said light along the path emitted from said liquid filled tube, said liquid cooperating with said tube defining said converging lens to directly concentrate onto the photosensitive means which is located essentially at the focal plane of said lens formed by said liquid filled tube.

2. The photoelectric device of claim 1 wherein said light source is an incandescent lamp means located a substantial multiple of said tube diameter from said tube and thereby establishing essentially parallel light impinging upon said tube.

3. The photoelectronic device of claim 1 or 2 wherein said photosensitive means includes a plurality of semiconducting elements located in a close spaced linear array aligned with said tube, the electrical conductivity of said elements being responsive to impinging light to define a series of binary logic signals to the opposite sides of said meniscus.

4. The photoelectronic device of claim 3 wherein said electronic output means includes counting means to record the number of elements from said end of the array to a change in the refractive properties, and means to compare said outputs to the number of elements in said array.

5. The photoelectronic device of claim 1 wherein the electromagnetic radiation source includes visible light frequency, said responsive surface being responsive to visible light, said tube and liquid being substantially transparent and colorless.

6. The photoelectronic device of claim 1 wherein said tube is circular in cross-section with a substantially constant wall thickness.

7. The photoelectronic device of claim 6 wherein exposed active area being a said responsive surface placed in a focal plane generated by said converging lens, said responsive surface being perpendicular to the plane generated by central optical axis of the source and tube, said responsive surface has an effective width substantially equal to the width of the light beam at said focal plane.

8. The device of claim 7 wherein the responsive means includes an array of elements connected to create a sequence of binary outputs.

9. The device of claim 8 wherein said responsive elements are phototransistors.

10. The apparatus of claim 8 wherein an output means is connected to said array and includes means to count the number of elements in a corresponding state.

11. A photosensitive detector apparatus for monitoring a pressure, comprising a tube of light transmitting medium, said tube having a wall of a substantially constant thickness whereby the light transmitting characteristic is substantial constant throughout the length, a liquid and an immiscible fluid in said tube subjected to said pressure whereby the interface within the tube is pressure sensitive, a light source located to one side of said tube and establishing a light beam of substantially parallel light engaging said tube and illuminating said tube throughout essentially the total width and a substantial axial length, said tube and said liquid defining a converging lens having a focal point closely adjacent said tube opposite said light source, said tube and said fluid defining a transmitting pattern distinctly different from said lens, a photosensitive array having a plurality of active elements located in a linear array adjacent said focal point and including opposite ends aligned with said tube, and a non-lensing medium interposed between said tube and said active area and operable to directly transmit the light from said tube on an essentially linear path.

12. The photosensitive unit of claim 11 wherein each of said elements is a planar member embedded within a light transmitting plastic shell defining said non-lensing medium, said shell having a thin film covering over said planar member and having a smooth surface receiving said light.

13. The photosensitive detector apparatus of claim 11 or 12, including a binary counting means connected to said elements and recording the number of elements from the opposite ends of said array, and means to compare said count to the elements in said array.

14. The photosensitive detector apparatus of claim 11 or 12 wherein said tube is a U-shaped member having said liquid in both sides and connecting base, including first and second arrays aligned one each with each side of said member, and means to compare the outputs of said arrays.

15. The photosensitive detector apparatus of claim 14, including a binary counting means connected to said elements and recording the number of elements from the opposite ends of said array, and means to compare said count to the elements in said array and means for detecting the difference in the number of elements aligned with the liquid in each side of the U-shaped member.

16. A noninvasive level detecting apparatus having a radiation transmitting tubular member containing a first liquid and a second fluid medium defining an interface to be detected, said liquid conjointly operating with said tubular member to focus said radiation upon a transducer located at a focal plane located near the outer surface of said tubular member, said second fluid medium conjointly operating with said tubular member to disperse said radiation with respect to said focal plane for producing a binary logic output in response to preselected positioning of the interface relative to said transducer means.

17. The apparatus of claim 1 wherein said photosensitive area is covered with a protective plastic layer having a smooth planar surface, said layer moving the effective focal plane, and said sensitive area being located in said effective focal plane.

18. The level detecting apparatus of claim 16 wherein said transducer means including said photosensitive areas aligned with said tube, each of said photosensitive areas having an output, a Schmitt trigger connected to said sensitive areas, whereby a bilevel logic output state of each area is generated, connected to each transducer and connected to form a common summing junction, and thereby producing a stepwise continuous electrical analog signal representative of the number of activated transducers.

19. The apparatus of claim 18 including means connected to the transducers of the opposite ends of the array and operable to create a signal responsive to both said end transducers.

* * * * *